(12) United States Patent
Kim et al.

(10) Patent No.: US 9,543,611 B2
(45) Date of Patent: Jan. 10, 2017

(54) RECHARGEABLE BATTERY

(71) Applicant: Samsung SDI Co., Ltd., Yongin-si, Gyeonggi-do (KR)

(72) Inventors: Min-Han Kim, Yongin-si (KR); Joong-Ho Moon, Yongin-si (KR); Ju-Hyeong Han, Yongin-si (KR); Kyoung-Hyun Kim, Yongin-si (KR); Do-Hyung Park, Yongin-si (KR); Han-Eol Park, Yongin-si (KR); Seon-Young Kwon, Yongin-si (KR); Yu-Mi Song, Yongin-si (KR); Ming-Zi Hong, Yongin-si (KR); Ki-Hyun Kim, Yongin-si (KR); Sang-Hoon Kim, Yongin-si (KR); Sun-Ho Kang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 389 days.

(21) Appl. No.: 14/179,394

(22) Filed: Feb. 12, 2014

(65) Prior Publication Data

US 2015/0118532 A1 Apr. 30, 2015

(30) Foreign Application Priority Data

Oct. 30, 2013 (KR) .......................... 10-2013-0130442

(51) Int. Cl.
*H01M 10/04* (2006.01)
*H01M 10/02* (2006.01)
*H01M 10/42* (2006.01)
*H01M 4/02* (2006.01)

(52) U.S. Cl.
CPC ........... *H01M 10/0436* (2013.01); *H01M 4/02* (2013.01); *H01M 10/0431* (2013.01); *H01M 10/4235* (2013.01); *H01M 10/0445* (2013.01); *H01M 10/0463* (2013.01); *H01M 2010/4292* (2013.01); *H01M 2220/30* (2013.01)

(58) Field of Classification Search
CPC ..................... H01M 10/0431; H01M 10/0436; H01M 10/4235
See application file for complete search history.

(56) References Cited

U.S. PATENT DOCUMENTS

| | | | |
|---|---|---|---|
| 2010/0104930 A1 | 4/2010 | Kim et al. | |
| 2010/0190049 A1* | 7/2010 | Kawase | H01M 2/1077 429/159 |
| 2011/0136002 A1* | 6/2011 | Cho | H01M 2/263 429/178 |
| 2011/0177378 A1* | 7/2011 | Han | H01M 4/131 429/153 |
| 2012/0121964 A1 | 5/2012 | Park et al. | |
| 2014/0349152 A1* | 11/2014 | Guen | H01M 10/42 429/65 |

FOREIGN PATENT DOCUMENTS

| KR | 2008-0087686 A | 10/2008 |
|---|---|---|
| KR | 2011-0024114 A | 3/2011 |

\* cited by examiner

*Primary Examiner* — Nicholas A Smith
(74) *Attorney, Agent, or Firm* — Knobbe Martens Olson & Bear LLP

(57) ABSTRACT

A rechargeable battery includes: a case; a first electrode assembly accommodated in the case; and second and third electrode assemblies accommodated in the case at positions adjacent to the case with the first electrode assembly being disposed therebetween. The second and third electrode assemblies have thicknesses different from that of the first electrode assembly.

18 Claims, 5 Drawing Sheets

RECHARGEABLE BATTERY

CROSS-REFERENCE TO RELATED APPLICATIONS

This application claims the benefit of Korean Patent Application No. 10-2013-0130442, filed on Oct. 30, 2013, in the Korean Intellectual Property Office, the disclosure of which is incorporated herein in its entirety by reference.

BACKGROUND

Field

One or more embodiments of the present invention relate to a rechargeable battery.

Description of the Related Technology

Unlike primary batteries, secondary batteries (rechargeable batteries) are rechargeable and are widely used in small high-tech electronic devices such as cellular phones, personal digital assistants (PDAs), and laptop computers.

High energy batteries are required with the advance of electronic devices. In addition, since rechargeable batteries are used for long periods of time after recharging, the safety of rechargeable batteries in the use environment have become an important issue. Particularly, if a conductive material penetrates a rechargeable battery due to, for example, an impact, the rechargeable battery may explode by an internal short circuit.

SUMMARY OF CERTAIN INVENTIVE ASPECTS

One or more embodiments of the present invention include a rechargeable battery including a plurality of electrode assemblies.

Additional aspects will be set forth in part in the description which follows and, in part, will be apparent from the description, or may be learned by practice of the presented embodiments.

According to one or more embodiments of the present invention, a rechargeable battery includes: a case; a first electrode assembly accommodated in the case; and second and third electrode assemblies accommodated in the case at positions adjacent to the case with the first electrode assembly being disposed therebetween, wherein the second and third electrode assemblies have thicknesses different from that of the first electrode assembly.

The first electrode assembly may have energy density higher than energy density of the second electrode assembly and energy density of the third electrode assembly, and the second and third electrode assemblies may be thinner than the first electrode assembly.

The first electrode assembly may be formed by stacking a first positive electrode plate, a first negative electrode plate, and a first separator therebetween, and winding the first positive electrode plate, the first separator, and the first negative electrode plate. The second electrode assembly may be formed by stacking a second positive electrode plate, a second negative electrode plate, and a second separator therebetween, and winding the second positive electrode plate, the second separator, and the second negative electrode plate. The third electrode assembly may be formed by stacking a third positive electrode plate, a third negative electrode plate, and a third separator therebetween, and winding the third positive electrode plate, the third separator, and the third negative electrode plate. At least one of the second and third electrode assemblies may be wound with fewer turns than winding turns of the first electrode assembly.

The first electrode assembly may include a first positive electrode plate formed by coating a positive electrode collector with an active material, a first negative electrode plate formed by coating a negative electrode collector with an active material, and a first separator. The second electrode assembly may include a second positive electrode plate formed by coating a positive electrode collector with an active material, a second negative electrode plate formed by coating a negative electrode collector with an active material, and a second separator. The third electrode assembly may include a third positive electrode plate formed by coating a positive electrode collector with an active material, a third negative electrode plate formed by coating a negative electrode collector with an active material, and a third separator.

At least one of the positive electrode collector of the second positive electrode plate and the positive electrode collector of the third positive electrode plate may be thicker than the positive electrode collector of the first positive electrode plate.

At least one of the positive electrode collector of the second positive electrode plate and the positive electrode collector of the third positive electrode plate may be about 1.2 or more times as thick as the positive electrode collector of the first positive electrode plate.

At least one of the negative electrode collector of the second negative electrode plate and the negative electrode collector of the third negative electrode plate may be thicker than the negative electrode collector of the first negative electrode plate.

At least one of the negative electrode collector of the second negative electrode plate and the negative electrode collector of the third negative electrode plate may be about 1.25 or more times as thick as the negative electrode collector of the first negative electrode plate.

At least one of the second separator and the third separator may be thicker than the first separator.

At least one of the second separator and the third separator may be about 1.14 or more times as thick as the first separator.

A coating amount per unit area of the active material of the first positive electrode plate may be different from a coating amount per unit area of the active material of the second positive electrode plate and a coating amount per unit area of the active material of the third positive electrode plate, or a coating amount per unit area of the active material of the first negative electrode plate per may be different from a coating amount per unit area of the active material of the second negative electrode plate and a coating amount per unit area of the active material of the third negative electrode plate.

According to one or more embodiments of the present invention, a rechargeable battery includes: a case; a first electrode assembly accommodated in the case, the first electrode assembly including a first positive electrode plate formed by coating a first positive electrode collector with an active material, a first negative electrode plate formed by coating a first negative electrode collector with an active material, and a first separator disposed therebetween; a second electrode assembly accommodated in the case, the second electrode assembly including a second positive electrode plate formed by coating a second positive electrode collector with an active material, a second negative electrode plate formed by coating a second negative electrode collector with an active material, and a second separator disposed therebetween; and a third electrode assembly accommodated in the case, the third electrode assembly including a third positive electrode plate formed by coating a third positive electrode collector with an active material, a third negative electrode plate formed by coating a third negative electrode collector with an active material, and a third separator disposed therebetween, wherein the second and third electrode assemblies are disposed adjacent to the case, the first electrode assembly is disposed between the first and second electrode assemblies, and the second and third electrode assemblies have energy density lower than energy density of the first electrode assembly.

A thickness of at least one of the first positive electrode collector, the first negative electrode collector, and the first separator may be different from a thickness of at least one of the second positive electrode collector, the second negative electrode collector, and the second separator, or may be different from a thickness of at least one of the third positive electrode collector, the third negative electrode collector, and the third separator.

The second and third electrode assemblies may be thinner than the first electrode assembly.

The second positive electrode collector and the third positive electrode collector may be thicker than the first positive electrode collector.

The second negative electrode collector and the third negative electrode collector may be thicker than the first negative electrode collector.

The second separator and the third separator may be thicker than the first separator.

A coating amount per unit area of the active material of the second positive electrode plate and a coating amount per unit area of the active material of the third positive electrode plate may be greater than a coating amount per unit area of the active material of the first positive electrode plate.

A coating amount per unit area of the active material of the second negative electrode plate and a coating amount per unit area of the active material of the third negative electrode plate may be greater than a coating amount per unit area of the active material of the first negative electrode plate.

The separator of the second electrode assembly and the separator of the third electrode assembly may be coated with an inorganic or organic material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF CERTAIN INVENTIVE EMBODIMENTS

Figure 1:
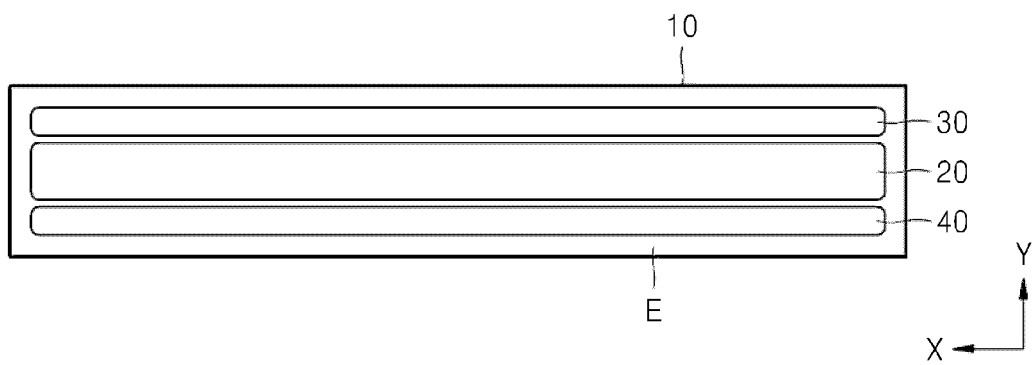
FIG. 1 is a schematic cross-sectional view illustrating a rechargeable battery according to an embodiment of the present invention.

Reference will now be made in detail to embodiments, examples of which are illustrated in the accompanying drawings. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations will be ruled out in order not to unnecessarily obscure subject matters of the present invention. It will be understood that although the terms "first" and "second" are used herein to describe various elements, these elements should not be limited by these terms. Terms are only used to distinguish one element from other elements. In the following description, the technical terms are used only for explaining a specific exemplary embodiment while not limiting the present invention. The terms of a singular form may include plural forms unless referred to the contrary. The meaning of 'include' or 'comprise' specifies a property, a fixed number, a step, a process, an element, a component, and a combination thereof but does not exclude other properties, fixed numbers, steps, processes, elements, components, and combinations thereof. In the following description, the symbol "/" may be construed as "and" or "or" according to the context.

In the drawings, the thicknesses of layers or regions may be exaggerated for clarity. In addition, like reference numerals refers to like elements throughout. It will be understood that when a layer, a film, a region, or a plate is referred to as being "on" or "above" another layer, film, region, or plate, it can be directly on the other layer, film, region, or plate, or intervening layers, films, regions, or plates may also be present.

FIG. 1 is a schematic cross-sectional view illustrating a rechargeable battery according to an embodiment of the present invention.

Referring to FIG. 1, the rechargeable battery includes a case 10 and a plurality of electrode assemblies disposed in the case 10. The plurality of electrode assemblies include at least three (first to third) electrode assemblies 20, 30, and 40. The first to third electrode assemblies 20, 30, and 40 are impregnated with electrolyte E.

The case 10 may include a metallic material for maintaining mechanical strength and may have a prismatic shape. In another embodiment, the case 10 may be a polymer pouch type.

The first, second, and third electrode assemblies 20, 30, and 40 are accommodated in the case 10. In detail, the second and third electrode assemblies 30 and 40 are disposed adjacent to the case 10, that is, adjacent to inner sides of the case 10, and the first electrode assembly 20 is disposed between the second and third electrode assemblies 30 and 40.

Since the rechargeable battery is used for long periods of time after recharging, the safety of the rechargeable battery should be enhanced during the use thereof. If a conductive material penetrates the rechargeable battery, the rechargeable battery may be rapidly heated to a high temperature due to an internal short circuit, to result in a fire or explosion.

In a safety test, a conductive material such as a nail is penetrated through a rechargeable battery. If the rechargeable battery is constituted by a single high-energy-density electrode assembly, heat discharge or current dispersion may inadequately occur when the conductive material is penetrated, and a large amount of current may instantaneously flow as a result of an internal short circuit between positive and negative electrodes. In addition, the rechargeable battery may burn or explode.

However, according to embodiments of the present invention, the second and third electrode assemblies 30 and 40, which are thermally more stable than the first electrode assembly, are disposed adjacent to the inner sides of the case 10, and thus when a conductive material penetrates the rechargeable battery and causes an internal short circuit, heat discharge and current dispersion may be improved.

The second and third electrode assemblies 30 and 40 may be thermally more stable than the first electrode assembly 20. Therefore, discharging heat and dispersing current instantaneously generated by an internal short circuit may be improved or more effectively discharged and dispersed by using the second and third electrode assemblies 30 and 40.

The first electrode assembly 20 is disposed in a center region of the case 10. The first electrode assembly 20 may have higher energy density than the second and third electrode assemblies 30 and 40. The first electrode assembly 20 takes charge of the capacity of the rechargeable battery and thus has a thickness greater than each of the thicknesses of the second and third electrode assemblies 30 and 40. Although the second and third electrode assemblies 30 and 40 may be electrically connected to the first electrode assembly 20 to contribute to the total capacity of the rechargeable battery, the main function of the second and third electrode assemblies 30 and 40 is to effectively discharge heat and current in case of an internal short circuit as described above. Thus, to sufficiently use the inner space of the case 10 and guarantee a sufficient level of capacity, the second and third electrode assemblies 30 and 40 are thinner than the first electrode assembly 20.

Hereinafter, the second and third electrode assemblies 30 and 40 and the first electrode assembly 20 of the rechargeable battery will be described in more detail with reference to FIGS. 2 and 3 according to embodiments of the present invention.

Figure 2:
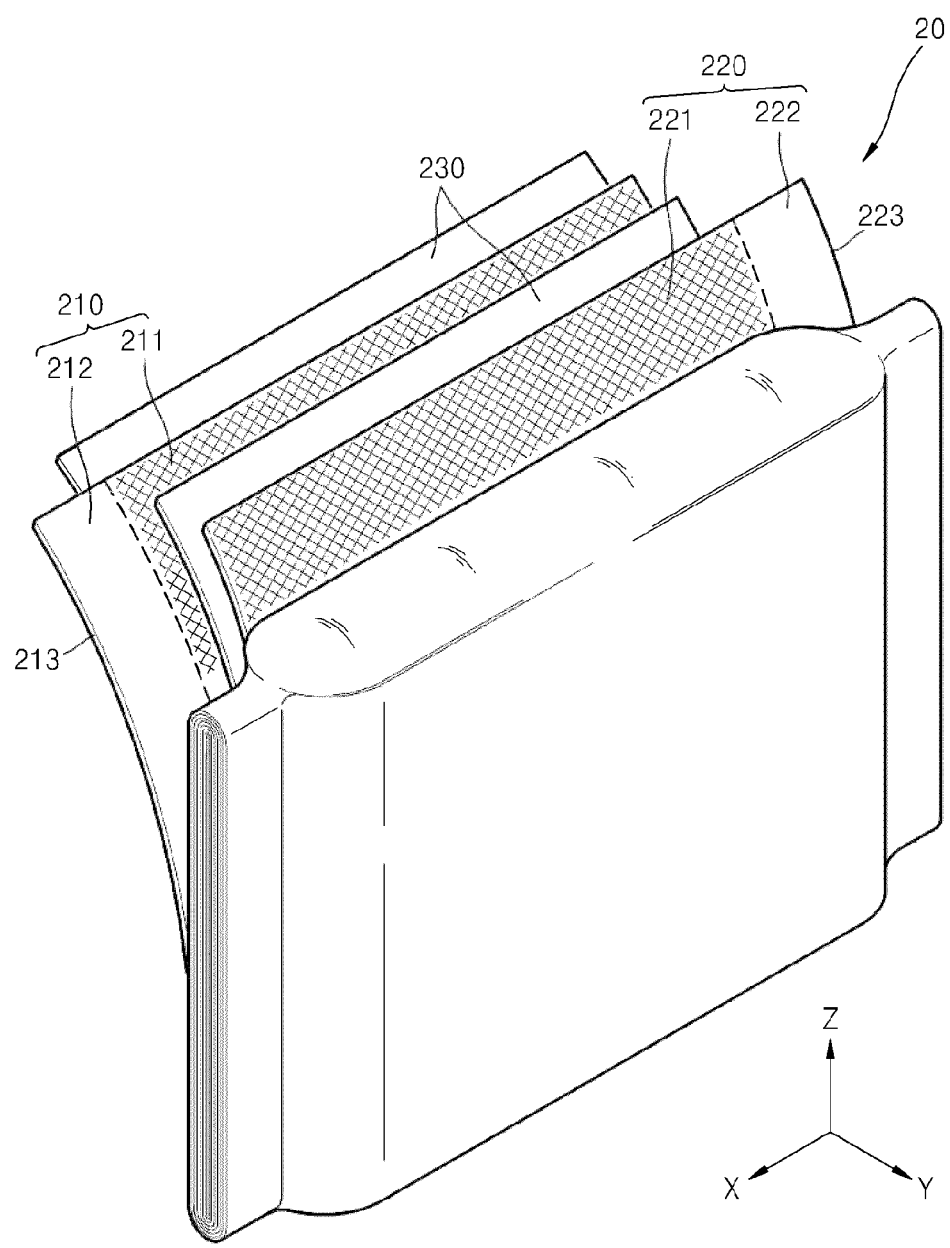
FIG. 2 is a schematic perspective view illustrating a first electrode assembly to an embodiment of the present invention.
Figure 3:
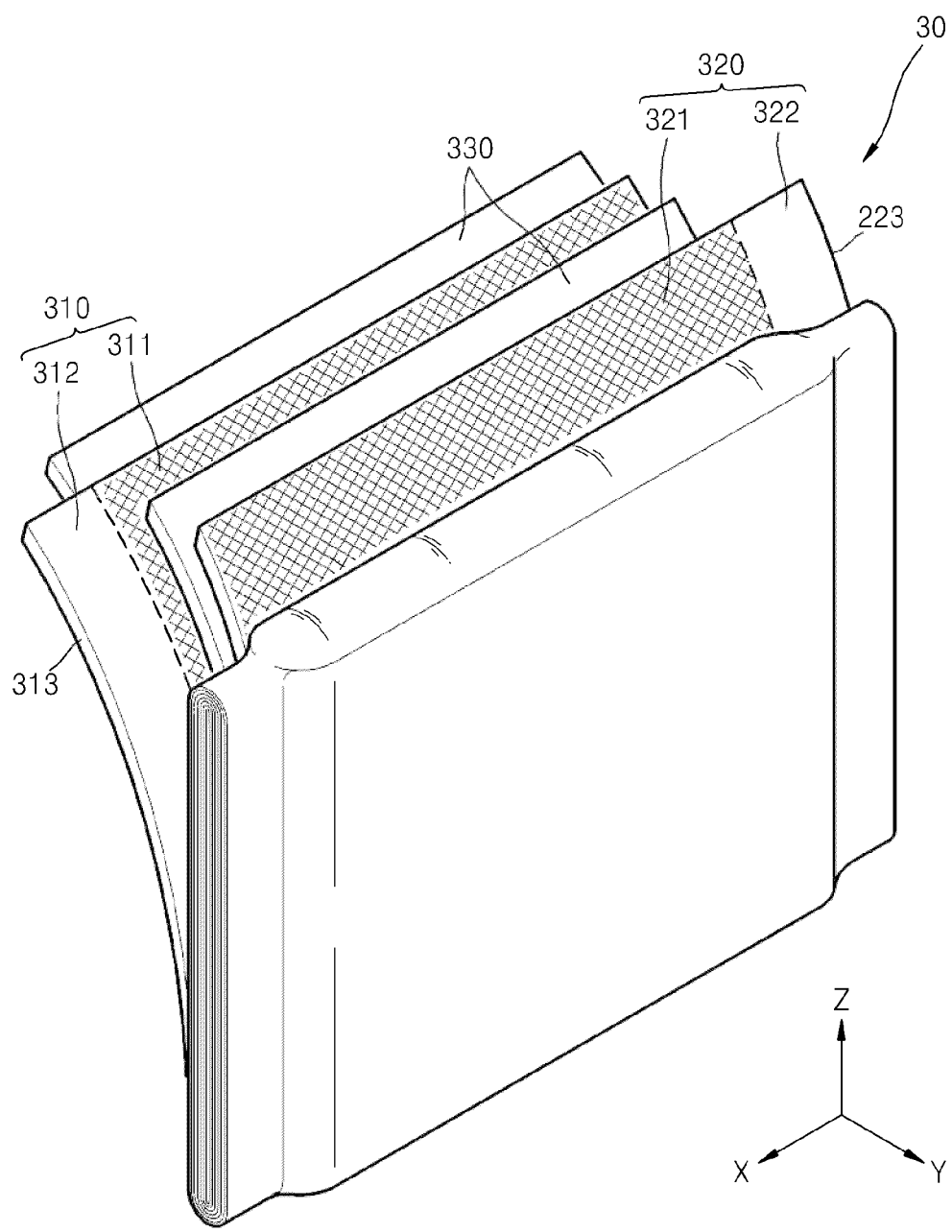
FIG. 3 is a schematic perspective view illustrating a second electrode assembly to an embodiment of the present invention.
Figure 4:
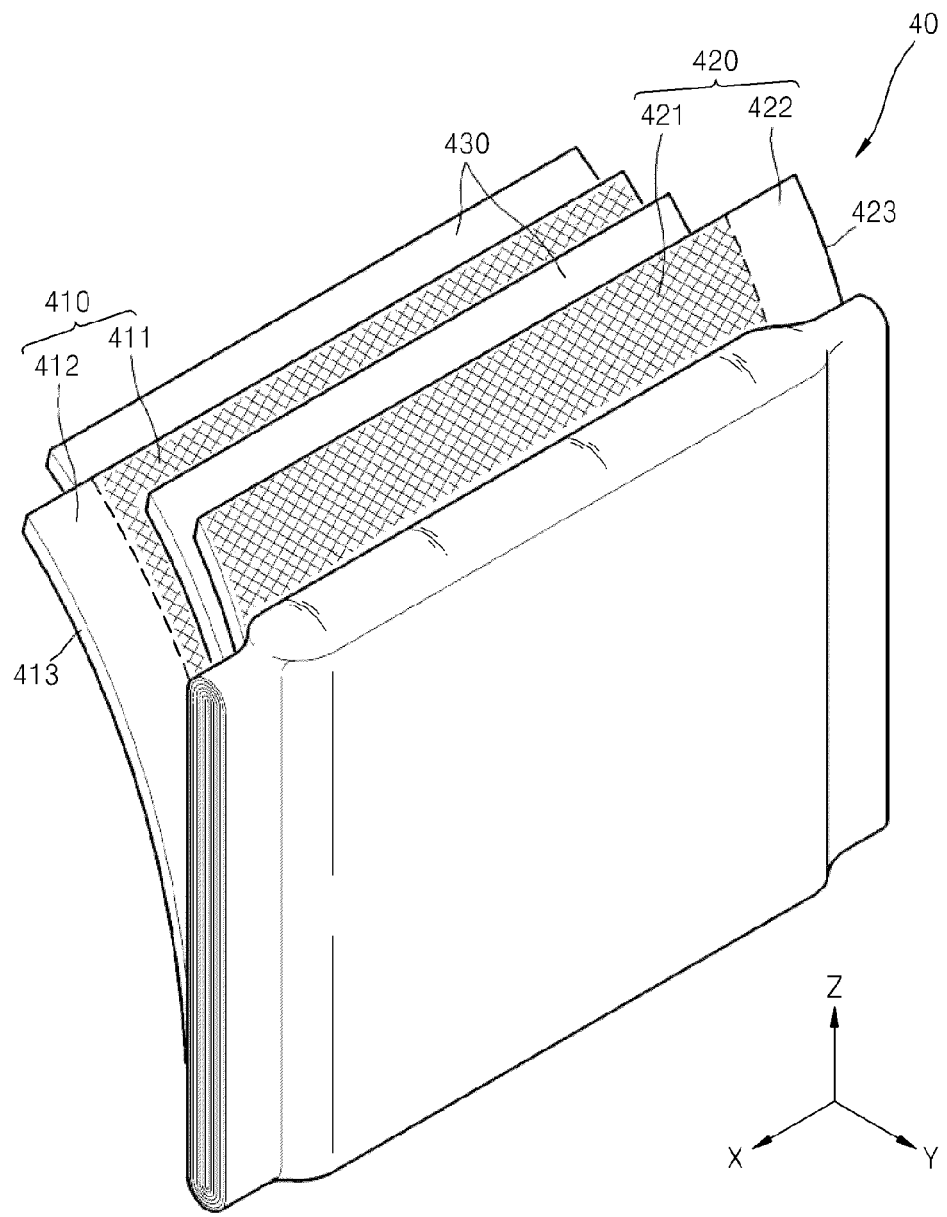
FIG. 4 is a schematic perspective view illustrating a third electrode assembly to an embodiment of the present invention.

FIG. 2 is a schematic perspective view illustrating the first electrode assembly 20 according to an embodiment of the present invention, and FIG. 3 is a schematic perspective view illustrating the second electrode assembly 30 according to an embodiment of the present invention. FIG. 4 is a schematic perspective view illustrating the third electrode assembly 40 according to an embodiment of the present invention.

Referring to FIGS. 2 to 4, the first electrode assembly 20 is thicker than the second electrode assembly 30, and is also thicker than the third electrode assembly 40.

Referring to FIG. 2, the first electrode assembly 20 includes a first positive electrode plate 210, a first negative electrode plate 220, and a first separator 230 disposed therebetween. The first positive electrode plate 210 is formed by coating a first positive electrode collector 213 with a positive electrode active material, and the first negative electrode plate 220 is formed by coating a first negative electrode collector 223 with a negative electrode active material. The first positive electrode plate 210, the first separator 230, and the first negative electrode plate 220 may be sequentially stacked and rolled up (wound) in a jelly-roll type to form the first electrode assembly 20.

The first positive electrode plate 210 may include: a coating portion 211 formed by coating a portion of the first positive electrode collector 213 with the positive electrode active material; and a non-coating portion 212 not coated with the positive electrode active material. The first negative electrode plate 220 may include: a coating portion 221 formed by coating a portion of the first negative electrode collector 223 with the negative electrode active material; and a non-coating portion 222 not coated with the negative electrode active material.

Referring to FIG. 3, the second electrode assembly 30 includes a second positive electrode plate 310, a second negative electrode plate 320, and a second separator 330 disposed therebetween. The second positive electrode plate 310 is formed by coating a second positive electrode collector 313 with a positive electrode active material, and the second negative electrode plate 320 is formed by coating a second negative electrode collector 323 with a negative electrode active material. The second positive electrode plate 310, the second separator 330, and the second negative electrode plate 320 may be sequentially stacked and rolled up (wound) in a jelly-roll type to form the second electrode assembly 30.

The second positive electrode plate 310 may include: a coating portion 311 formed by coating a portion of the second positive electrode collector 313 with the positive electrode active material; and a non-coating portion 312 not coated with the positive electrode active material. The second negative electrode plate 320 may include: a coating portion 321 formed by coating a portion of the second negative electrode collector 323 with the negative electrode active material; and a non-coating portion 322 not coated with the negative electrode active material.

Referring to FIG. 4, like the second electrode assembly 30, the third electrode assembly 40 includes a third positive electrode plate 410, a third negative electrode plate 420, and a third separator 430 disposed therebetween. The third positive electrode plate 410 is formed by coating a third positive electrode collector 413 with a positive electrode active material, and the third negative electrode plate 420 is formed by coating a third negative electrode collector 423 with a negative electrode active material. The third positive electrode plate 410, the third separator 430, and the third negative electrode plate 420 may be sequentially stacked and rolled up (wound) in a jelly-roll type to form the third electrode assembly 40.

The third positive electrode plate 410 may include: a coating portion 411 formed by coating a portion of the third positive electrode collector 413 with the positive electrode active material; and a non-coating portion 412 not coated with the positive electrode active material. The third negative electrode plate 420 may include: a coating portion 421 formed by coating a portion of the third negative electrode collector 423 with the negative electrode active material; and a non-coating portion 422 not coated with the negative electrode active material.

As described above, the first electrode assembly 20 takes charge of a great part of the total charge of the rechargeable battery. Therefore, a stack of the first positive electrode plate 210, the first separator 230, and the first negative electrode plate 220 is wound with more turns than the turns of the second electrode assembly 30 and/or the turns of the third electrode assembly 40 so that the first electrode assembly 20 may be thicker than the second and third electrode assemblies 30 and 40. In this way, the first electrode assembly 20 may have high energy density.

To ensure the thermal stability of the second electrode assembly 30, at least one of the second positive electrode collector 313, the second negative electrode collector 323, and the second separator 330 may have a thick thickness. In addition, to ensure the thermal stability of the third electrode assembly 40, at least one of the third positive electrode collector 413, the third negative electrode collector 423, and the third separator 430 may have a thick thickness.

For example, at least one of the second positive electrode collector 313 and the third positive electrode collector 413 may be thicker than the first positive electrode collector 213. At least one of the second negative electrode collector 323 and the third negative electrode collector 423 may be thicker than the first negative electrode collector 223. At least one of the second separator 330 and the third separator 430 may be thicker than the first separator 230.

The thickness of the second positive electrode collector 313 may be about 1.2 or more times the thickness of the first positive electrode collector 213. In an embodiment, the thickness of the first positive electrode collector 213 may be about 10 μm or less, and the thickness of the second positive electrode collector 313 may be about 12 μm or greater. Likewise, the thickness of the third positive electrode collector 413 may be about 1.2 or more times the thickness of the first positive electrode collector 213.

The thickness of the second negative electrode collector 323 may be about 1.25 or more times the thickness of the first negative electrode collector 223. In an embodiment, the thickness of the first negative electrode collector 223 may be about 8 μm or less, and the thickness of the second negative electrode collector 323 may be about 10 μm or greater. Like the thickness of the second negative electrode collector 323, the thickness of the third negative electrode collector 423 may be about 1.25 or more times the thickness of the first negative electrode collector 223.

The thickness of the second separator 330 may be about 1.14 or more times the thickness of the first separator 230. In an embodiment, the thickness of the first separator 230 may be about 14 μm or less, and the thickness of the second separator 330 may be about 16 μm or greater. Like the thickness of the second separator 330, the thickness of the third separator 430 may be about 1.14 or more times the thickness of the first separator 230.

The effects of heat discharge and current dispersion may be improved by adjusting the thicknesses of the second and third positive electrode collectors 313 and 413 and/or the thicknesses of the second and third negative electrode collectors 323 and 423 to be large according to the above above-mentioned conditions. In addition, although an internal short circuit occurs, the second and third separators 330 and 430 may be prevented from melting to prevent or delay a short circuit between positive and negative electrodes, by adjusting the thicknesses of the second and third separators 330 and 430 to be large according to the above-mentioned conditions.

In another embodiment, the surfaces of the second separator 330 and/or the third separator 430 may be coated with a thermally stable inorganic or organic material such as alumina, polyethylene, or polypropylene.

The coating amount per unit area (hereinafter, a coating amount per unit area will be referred to as a loading level) of the positive electrode active material of the second positive electrode plate 310 and the loading level of the positive electrode active material of the third positive electrode plate 410 may be different from the loading level of the positive electrode active material of the first positive electrode plate 210. When the loading level of an active material is greater, output power is decreased, and thus, it is possible to improve thermal stability. In one embodiment, the loading levels of the positive electrode active materials of the second and third positive electrode plates 310 and 410 may be greater than the loading level of the positive electrode active material of the first positive electrode plate 210, so as to decrease output power and to ensure thermal stability. In another embodiment, the loading levels of the negative electrode active materials of the second and third negative electrode plates 320 and 420 may be greater than the loading level of the negative electrode active material of the first negative electrode plate 220, so as to decrease output power and to ensure thermal stability.

The non-coating portion 212 of the first positive electrode plate 210 of the first electrode assembly 20 may be electrically connected to the non-coating portion 312 of the second positive electrode plate 310 of the second electrode assembly 30 and the non-coating portion 412 of the third positive electrode plate 410 of the third electrode assembly 40. Similarly, the non-coating portion 222 of the first negative electrode plate 220 of the first electrode assembly 20 may be electrically connected to the non-coating portion 322 of the second negative electrode plate 320 of the second electrode assembly 30 and the non-coating portion 422 of the third negative electrode plate 420 of the third electrode assembly 40.

In the above-described embodiments, the three electrode assemblies 20, 30, and 40 are disposed in the case 10. However, the embodiments of the present invention are not limited thereto.

Figure 5:
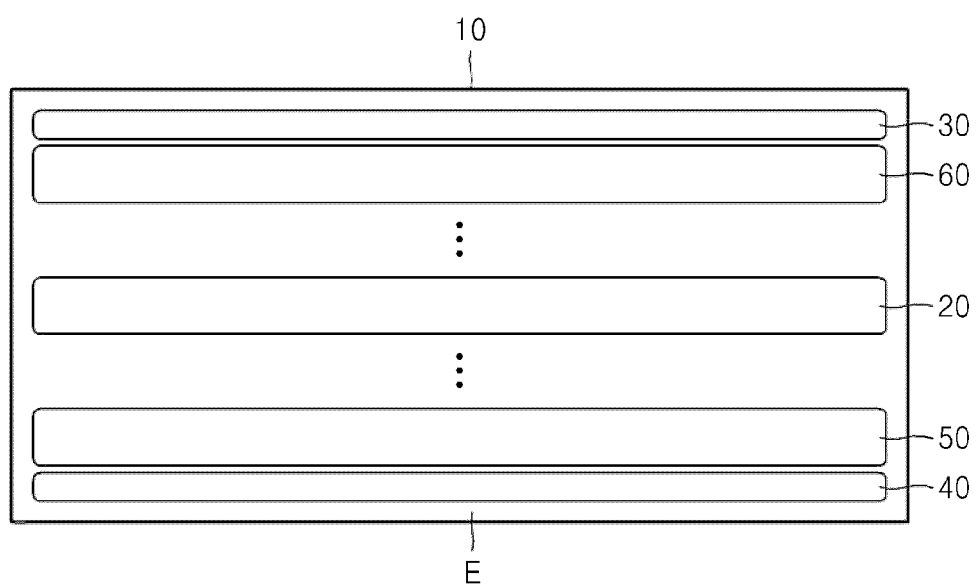
FIG. 5 is a schematic cross-sectional view illustrating a rechargeable battery according to another embodiment of the present invention.

As shown in FIG. 5, the second and third electrode assemblies 30 and 40 may be disposed adjacent to the case 10, that is, adjacent to inner sides of the case 10, and a plurality of electrode assemblies may be disposed between the second and third electrode assemblies 30 and 40. For example, a plurality of high-energy-density electrode assemblies such as a first electrode assembly 20, a fourth electrode assembly 50, and a fifth electrode assembly 60 may be disposed between the second electrode assembly 30 and the third electrode assembly 40. The electrode assemblies 20, 50, and 60 disposed between the second and third electrode assemblies 30 and 40 may have energy density higher than those of the second and third electrode assemblies 30 and 40, and may have the same structure as that of the above-described first electrode assembly 20.

As described above, according to the one or more of the above embodiments of the present invention, the high-energy-density electrode assembly is disposed in a center region, and the thermally stable electrode assemblies are disposed adjacent to the case. Therefore, heat discharge and current dispersion may be induced or improved when the rechargeable battery undergoes an internal short circuit caused by a conductive material penetrating the rechargeable battery.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. A rechargeable battery comprising:
a case;
a first electrode assembly accommodated in the case; and
second and third electrode assemblies accommodated in the case at positions adjacent to the case with the first electrode assembly being disposed therebetween,
wherein the second and third electrode assemblies have thicknesses different from that of the first electrode assembly and wherein the first, second and third electrode assemblies respectively have positive and negative electrode plates and wherein the positive and negative electrode plates of the second and third electrode assemblies are thicker than the positive and negative electrode plates of the first electrode assembly.

2. The rechargeable battery of claim 1, wherein the first electrode assembly has energy density higher than energy density of the second electrode assembly and energy density of the third electrode assembly, and wherein the second and third electrode assemblies are thinner than the first electrode assembly.

3. The rechargeable battery of claim 1, wherein
the first electrode assembly is formed by stacking a first positive electrode plate, a first negative electrode plate, and a first separator therebetween, and winding the first positive electrode plate, the first separator, and the first negative electrode plate,
the second electrode assembly is formed by stacking a second positive electrode plate, a second negative electrode plate, and a second separator therebetween, and winding the second positive electrode plate, the second separator, and the second negative electrode plate,
the third electrode assembly is formed by stacking a third positive electrode plate, a third negative electrode plate, and a third separator therebetween, and winding the third positive electrode plate, the third separator, and the third negative electrode plate, and
at least one of the second and third electrode assemblies is wound with fewer turns than winding turns of the first electrode assembly.

4. The rechargeable battery of claim 1, wherein
the first electrode assembly comprises a first positive electrode plate formed by coating a positive electrode collector with an active material, a first negative electrode plate formed by coating a negative electrode collector with an active material, and a first separator,
the second electrode assembly comprises a second positive electrode plate formed by coating a positive electrode collector with an active material, a second negative electrode plate formed by coating a negative electrode collector with an active material, and a second separator, and
the third electrode assembly comprises a third positive electrode plate formed by coating a positive electrode collector with an active material, a third negative electrode plate formed by coating a negative electrode collector with an active material, and a third separator.

5. The rechargeable battery of claim 4, wherein at least one of the positive electrode collector of the second positive electrode plate and the positive electrode collector of the third positive electrode plate is about 1.2 or more times as thick as the positive electrode collector of the first positive electrode plate.

6. The rechargeable battery of claim 4, wherein at least one of the negative electrode collector of the second negative electrode plate and the negative electrode collector of the third negative electrode plate is about 1.25 or more times as thick as the negative electrode collector of the first negative electrode plate.

7. The rechargeable battery of claim 4, wherein at least one of the second separator and the third separator is thicker than the first separator.

8. The rechargeable battery of claim 7, wherein at least one of the second separator and the third separator is about 1.14 or more times as thick as the first separator.

9. The rechargeable battery of claim 4, wherein
a coating amount per unit area of the active material of the first positive electrode plate is different from a coating amount per unit area of the active material of the second positive electrode plate and a coating amount per unit area of the active material of the third positive electrode plate, or
a coating amount per unit area of the active material of the first negative electrode plate is different from a coating amount per unit area of the active material of the second negative electrode plate and a coating amount per unit area of the active material of the third negative electrode plate.

10. A rechargeable battery comprising:
a case;
a first electrode assembly accommodated in the case, the first electrode assembly comprising a first positive electrode plate formed by coating a first positive electrode collector with an active material, a first negative electrode plate formed by coating a first negative electrode collector with an active material, and a first separator disposed therebetween;
a second electrode assembly accommodated in the case, the second electrode assembly comprising a second positive electrode plate formed by coating a second positive electrode collector with an active material, a second negative electrode plate formed by coating a second negative electrode collector with an active material, and a second separator disposed therebetween; and
a third electrode assembly accommodated in the case, the third electrode assembly comprising a third positive electrode plate formed by coating a third positive electrode collector with an active material, a third negative electrode plate formed by coating a third negative electrode collector with an active material, and a third separator disposed therebetween,
wherein the second and third electrode assemblies are disposed adjacent to the case,
the first electrode assembly is disposed between the first and second electrode assemblies, and
the second and third electrode assemblies have energy density lower than energy density of the first electrode assembly and wherein the positive and negative electrode plates of the second and third electrode assemblies are thicker than the positive and negative electrode plates of the first electrode assembly.

11. The rechargeable battery of claim 10, wherein a thickness of at least one of the first positive electrode collector, the first negative electrode collector, and the first separator is different from a thickness of at least one of the second positive electrode collector, the second negative electrode collector, and the second separator, or is different from a thickness of at least one of the third positive electrode collector, the third negative electrode collector, and the third separator.

12. The rechargeable battery of claim 10, wherein the second and third electrode assemblies are thinner than the first electrode assembly.

13. The rechargeable battery of claim 10, wherein the second positive electrode collector and the third positive electrode collector are thicker than the first positive electrode collector.

14. The rechargeable battery of claim 10, wherein the second negative electrode collector and the third negative electrode collector are thicker than the first negative electrode collector.

15. The rechargeable battery of claim 10, wherein the second separator and the third separator are thicker than the first separator.

16. The rechargeable battery of claim 10, wherein a coating amount per unit area of the active material of the second positive electrode plate and a coating amount per unit area of the active material of the third positive electrode plate are greater than a coating amount per unit area of the active material of the first positive electrode plate.

17. The rechargeable battery of claim 10, wherein a coating amount per unit area of the active material of the second negative electrode plate and a coating amount per unit area of the active material of the third negative electrode plate are greater than a coating amount per unit area of the active material of the first negative electrode plate.

18. The rechargeable battery of claim 11, wherein the separator of the second electrode assembly and the separator of the third electrode assembly are coated with an inorganic or organic material.

* * * * *